United States Patent [19]

Thompson et al.

[11] 4,203,509
[45] May 20, 1980

[54] CARGO ROLLER

[75] Inventors: Richard T. Thompson, Haddam; Richard J. Matt, W. Simsbury, both of Conn.

[73] Assignee: Textron Inc., Providence, R.I.

[21] Appl. No.: 918,355

[22] Filed: Jun. 23, 1978

[51] Int. Cl.² .......................... B64D 9/00; B65G 13/00
[52] U.S. Cl. .................................................. 193/37
[58] Field of Search ................ 29/116 R, 122; 193/37

[56] References Cited

U.S. PATENT DOCUMENTS

| 2,768,725 | 10/1956 | Foulds et al. | 193/37 |
| 3,669,243 | 6/1972 | Fischbacher | 193/37 |
| 3,753,541 | 8/1973 | Grueber | 193/37 |
| 3,895,844 | 7/1975 | Merbler | 193/37 |

FOREIGN PATENT DOCUMENTS 704187 2/1965 Canada .......................... 193/37

Primary Examiner—Richard A. Bertsch
Attorney, Agent, or Firm—Hopgood, Calimafde, Kalil, Blaustein & Lieberman

[57] ABSTRACT

The invention contemplates a cylindrical cargo-roller construction wherein a circumferentially continuous molded-plastic elongate cylindrically annular tire is carried between radial flanges at the ends of a rigid tubular body. The tire is of slightly larger diameter than the flanges, and radial bearings are fitted beneath the radial flanges, so that overloads are sustained directly via the radial flanges, whereas normal loads are distributed along the length of the tire.

17 Claims, 4 Drawing Figures

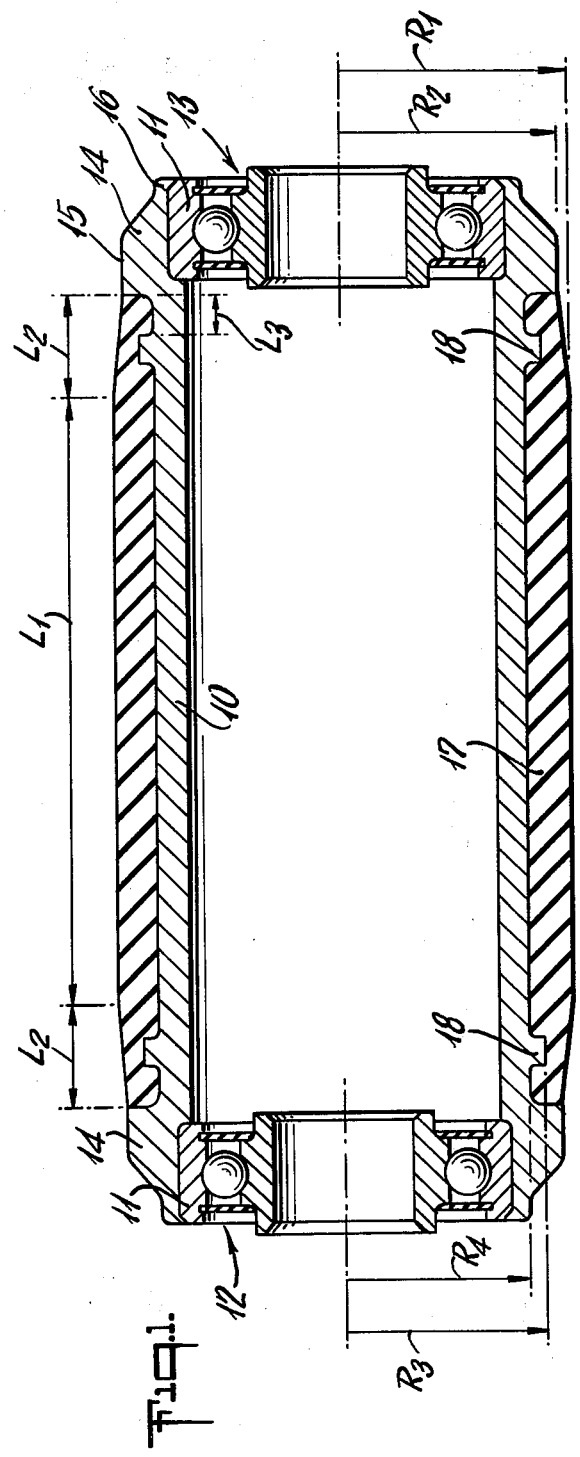
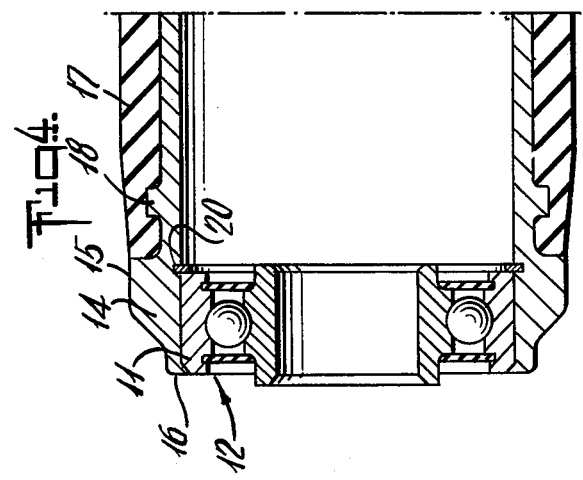
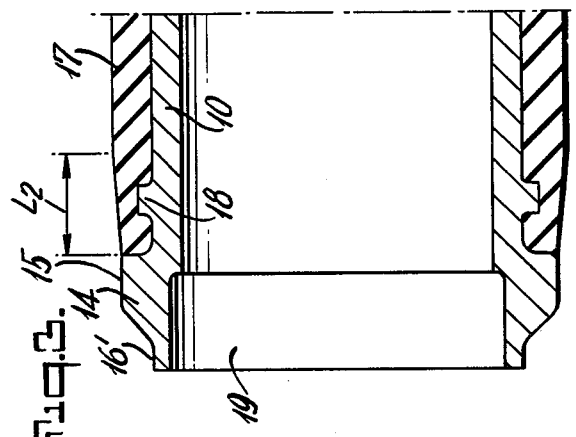
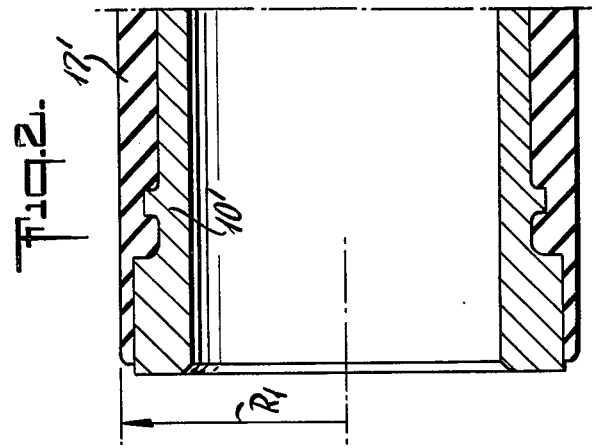

CARGO ROLLER

The invention relates to a cargo roller particularly adapted to use in multiple to establish a light-weight high-strength roller floor for cargo-carrying aircraft.

The economics of the air-freight industry demand that cargo aircraft be capable of carrying the maximum possible freight load, consistent with safe operation. This has led to demand for such lighter-weight components as to allow carrying additional cargo while keeping the total aircraft weight the same. The significance of this demand is expressed by a current estimate that the removal of one pound of weight of components is worth as much as $400 annually, in terms of increased revenues and lower operating costs.

In that aspect of possible weight reduction which focuses on cargo rollers, two designs have been considered and found to present significant drawbacks. A first design consistent of a tubular aluminum shell with a radial bearing installed at each axial end, and with a cylindrical nylon tire molded onto the shell; this design provided the desired weight reduction, but abusive loads encountered in service often caused the nylon tire to crack, leading to premature failure. In a second design, the construction was made as a solid aluminum tube with a radial bearing at each axial end; this proved to be more durable, but the weight was 50 percent greater.

It is, accordingly, an object of the invention to produce an improved cargo roller of the character indicated, avoiding the above-noted drawbacks of prior constructions.

A specific object is to produce an improved cargo roller having the inherent low weight of one of the indicated prior designs and having the durable characteristics of the other prior design.

Another specific object is to provide such a cargo roller with a molded nylon tire which will not be subjected to significant abuse in the presence of an overload on the roller.

A general object is to meet the above objects with a roller construction which lends itself to relatively inexpensive manufacture and which performs consistently for the full variety of loads and abuse encountered in an air-freight application, thereby extending the longevity of assembled frames of such rollers in multiple.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a longitudinal sectional view of a cargo roller of the invention;

FIGS. 2 and 3 are fragmentary vertical sectional views to show manufacturing steps; and FIG. 4 is a fragmentary view similar to FIG. 1 to show a modification.

The construction of FIG. 1 comprises an elongate rigid tubular body 10 having a cylindrical bore and counterbored at each axial end to define a shoulder to which the outer ring of spaced radial-bearing means 12-13 is permanently fitted; bearings 12-13 are preferably sealed ball bearings, as shown. At or near each of its axial ends the body 10 is characterized by a relatively wide, circumferentially continuous, radially outward flange 14, in such axial overlap with the nearby radial bearing that the broad outer cylindrical surface 15 of the flange 14 extends to substantially the central radial plane of support provided by the radial bearing. Axially outward from this point, each flange 14 tapers inwardly to define a short reduced end 16 which will be understood to have been swaged inwardly to retain assembly of the associated outer bearing ring 11.

Between the spaced end flanges, and therefore also between the regions of radial-bearing support, the outer surface of body 10 is generally cylindrical, at radius less than flanges 14, to define a circumferentially continuous elongate tire groove therebetween. And a circumferentially continuous solid tire 17 of elastomeric or plastic material, as of a suitable urethane or nylon, is injection-molded to more than fill the groove. The outer surface of the tire 17 may be said to be gently crowned to a maximum radius $R_1$ outwardly of the radius $R_2$ of the cylindrical surface 15 of flanges 14. Preferably, for the substantial fraction $L_1$ of its length, the outer tire surface is cylindrical at radius $R_1$, the crown effect being established by gentle inwardly tapered end regions, of axial extent designated $L_2$, and reducing to conformance with the radius $R_2$ of adjacent flange surface 15. Preferably also, the body surface between flanges 14, and to which tire 17 is molded, has integral secondary-flange formations 18 which rise to a radius $R_3$ that is about half-way intermediate the radius $R_4$ of the cylindrical outer surface of body 10 and the radius $R_2$ of the flange surface 15. The secondary-flange formations 18 lie axially intermediate the ends of the associated inward taper regions $L_2$ and are axially spaced from the nearby flange 14 to an extent $L_3$ which approximates the radial thickness of the tapered end of the tire 17.

We find it convenient to manufacture the described cargo roller by first machining the tubular body with aluminum, to the shape depicted for part 10' in FIG. 2, wherein the described ultimate outer cylindrical body-surface profile is recognized, complete with secondary-flange formations 18 and preferably filleted corners at all concave corner intersections. At the stage depicted in FIG. 2, the body part 10' has an outer-flange cylindrical surface 15' which extends all the way to the adjacent end of the body. FIG. 2 also serves to show that the injection-molding of the tire may be made by inserting the body part 10' into a cupped cavity having a straight cylindrical wall to define a continuous cylindrical outer surface of tire material 17', preferably to the maximum ultimate cylindrical radius $R_1$ of tire 17.

The next steps are depicted in FIG. 3, namely, (a) counterboring each axial end of the body bore at 19 to a depth matching the axial width of the outer bearing ring 11, (b) machining the reduced end profile 16' of flange 14, and (c) grinding off excess tire material to define the gradual taper over the distance $L_2$. This taper may be gently sloped, in the range 2 to 5 degrees, and for the specific roll to be later specified, the taper is about 3 degrees. The final step is to assemble ball bearings 12-13 to their respective counterbores, and then to employ a conical swaging tool to deform the reduced end 16' into circumferentially continuous locking envelopment of the outer end chamfer of the outer bearing ring 11.

The described construction is found to satisfy all stated objects and to provide long life in a light-weight product which will sustain even the worst loads. For normal loads, the cylindrical surface of the tire 17 is the only surface to contact the load. However, with increasing load, the tire is locally flattened to the limiting radial extent $R_1$ minus $R_2$, whereupon all further increments of load are sustained by flange surfaces 15 alone, and in direct radial-force transmitting alignment with the respective planes of radial-bearing support. Thus, for overload conditions, which are usually transient in nature, the tire 17 is not called upon to take the excess, thereby avoiding excessive force upon the central span of body 10 and enabling weight economy through use of a body 10 of minimum sectional thickness (body bore to radius $R_4$). The end flanges 14 serve additionally to axially confine tire 17 against axial deformation, and the secondary-flange formations 18 anchor the axial ends of the tire against axial shrinkage from adjacency to flanges 14.

In a specific employment of the invention, the roller has an overall length of 2.5 inches, measured over the outer limits defined by wide inner rings of the ball bearings, and the cylindrical tire diameter ($2R_1$) is 1.5 inches for a span $L_1$ of about 1.4 inches. The end tapers being about 0.16 inch long. The tire deflection to the point of overload relief at flange surfaces 15 is a little more than 0.010 inch. The injected tire material is basically a tough variety of nylon, which may be compounded with one or more additional materials selected from the group including carbon black, elastomeric material, and glass fiber; and we have obtained our highly satisfactory results using a so-called super-tough nylon known as Zytel, ST-100 Series, being a product of the DuPont Company, Wilmington, Delaware, the same having been compounded with small but functionally significant proportions of carbon black and synthetic rubber.

While the invention has been described in detail for the preferred form shown, it will be understood that modifications may be made without departing from the invention. For example, instead of counterboring the body 10, FIG. 4 illustrates a modification wherein the shoulder against which each outer bearing ring is seated is a snap ring 20, fitted to a retaining groove in an otherwise smoothly continuous body bore.

What is claimed is:

1. A cargo roller comprising, in combination, an elongate rigid tubular body with a radially outward circular flange at each axial end, radial-bearing means having separate outer bearing rings fitted to the axial ends of the bore of said body in substantial axial register with said flange, the outer surface of each body being of lesser radial extent than said flanges and generally cylindrical between said flanges, thereby defining an elongate relatively shallow circumferentially continuous groove between said flanges, a solid circumferentially continuous cylindrical deformable tire of cured hardenable material filling said groove and having a primary elongate cylindrical outer surface of diameter slightly exceeding the diameter of said flanges, the outer surface of said tire being gently tapered at its axial ends into substantially radial conformance with said flanges at adjacency with said flanges, whereby normal loads on said roller are sustained by said bearing rings via the cylindrical outer surface of said tire with said flanges retaining said tire against axial distention, and whereby excessive or overloading loads on said roller are sustained by said bearing rings via said flanges as direct radial loads on said bearing rings.

2. The cargo roller of claim 1, in which the generally cylindrical body surface between said flanges includes secondary radial-flange means in axially close adjacency to each of said first-mentioned flanges, each said secondary-flange means having a maximum radial extent which is approximately half the depth of said shallow groove.

3. The cargo roller of claim 2, in which said secondary-flange means rises radially outwardly from said shallow groove to an extent at least no more than half the depth of said shallow groove.

4. The cargo roller of claim 2, in which the axial location of each of said secondary radial-flange means is intermediate the axial limits of the associated gently tapered tire region.

5. The cargo roller of claim 2, in which, in the region between one of said secondary radial-flange means and the adjacent one of said first-mentioned flanges, the axial extent and the radial thickness of tire material are substantially the same.

6. The cargo roller of claim 1, in which the gentle taper at each axial end of said tire is in the range of 2 to 5 degrees.

7. The cargo roller of claim 1, in which the gentle taper at each axial end of said tire is approximately 3 degrees.

8. The cargo roller of claim 1, in which said outer bearing rings are each a component of an antifriction bearing at each axial end of said body.

9. The cargo roller of claim 8, in which each axial end of said tubular body has a counterbore defining a shoulder to which the associated outer bearing ring is fitted, and means fixedly retaining the counterbore-fitted relation of each outer bearing ring.

10. The cargo roller of claim 9, in which the axial ends of said body are reduced adjacent the associated radial flange, each reduced axial end of said body being deformed over the axially outer end of the asssociated outer bearing ring.

11. The cargo roller of claim 8, in which each antifriction bearing includes an inner bearing ring of axial extent projecting axially outwardly beyond said body and associated outer bearing ring.

12. The cargo roller of claim 1, in which said hardenable material is a nylon compounded with carbon black and elastomeric material.

13. A cargo roller comprising an elongate rigid tubular body with a circular radially outward overload flange at each axial end, radial ball-bearing means fitted to the axial ends of said body beneath each of the flanged regions thereof, a secondary radial flange integral with the outer surface of said body and in axially inwardly spaced proximity to each overload flange, the outer surface of said body being generally cylindrical between said secondary flanges and said secondary flanges being of approximately half the incremental radial extent of said overload flanges above said cylindrical surface, and a circumferentially continuous tire of injection-molded plastic material solidly filling the space between overload flanges with said secondary flanges embedded therein, the outer surface of said tire being gently radially outwardly crowned from radial conformance with said overload flanges at adjacency with said overload flanges.

14. The cargo roller of claim 13, in which the outer surface of said tire is elongate and cylindrical between inwardly crowning tapered axial end regions, said end regions axially overlapping the respective secondary flanges.

15. The cargo roller of claim 1, in which said hardenable material is a nylon compounded with carbon black.

16. The cargo roller of claim 1, in which said hardenable material is a nylon compounded with elastomeric material.

17. The cargo roller of claim 1, in which said hardenable material is a nylon compounded with glass fiber.

* * * * *